United States Patent
Hino et al.

(10) Patent No.: US 7,839,878 B2
(45) Date of Patent: Nov. 23, 2010

(54) METHOD OF REDUCING POWER CONSUMPTION OF NETWORK CONNECTION APPARATUS AND APPARATUS FOR SAME

(75) Inventors: Shunsuke Hino, Yokohama (JP); Toshio Doi, Kodaira (JP); Motoyuki Unno, Hadano (JP)

(73) Assignee: Alaxala Networks Corporation, Kanagawa (JP)

( * ) Notice: Subject to any disclaimer, the term of this patent is extended or adjusted under 35 U.S.C. 154(b) by 890 days.

(21) Appl. No.: 11/488,005

(22) Filed: Jul. 18, 2006

(65) Prior Publication Data

US 2007/0053360 A1 Mar. 8, 2007

(30) Foreign Application Priority Data

Sep. 5, 2005  (JP)  ............................. 2005-255820
May 24, 2006  (JP)  ............................. 2006-143512

(51) Int. Cl.
*H04L 12/28* (2006.01)
*H04L 12/26* (2006.01)
*H04L 12/50* (2006.01)

(52) U.S. Cl. ..................... 370/419; 370/252; 370/386

(58) Field of Classification Search .................. 370/389, 370/252, 386, 419
See application file for complete search history.

(56) References Cited

U.S. PATENT DOCUMENTS

| | | | | |
|---|---|---|---|---|
| 5,692,141 A | * | 11/1997 | Kamisango et al. | ......... 715/751 |
| 6,091,934 A | * | 7/2000 | Berman et al. | ............. 455/13.4 |
| 6,999,771 B1 | * | 2/2006 | Kasapi et al. | ................ 455/450 |
| 7,450,522 B2 | * | 11/2008 | Feder et al. | ................. 370/252 |
| 2004/0135676 A1 | * | 7/2004 | Berkman et al. | ....... 340/310.01 |
| 2005/0157752 A1 | * | 7/2005 | Takase et al. | ................ 370/468 |
| 2005/0276263 A1 | * | 12/2005 | Suetsugu et al. | ............ 370/389 |
| 2006/0045009 A1 | * | 3/2006 | Madison et al. | ............. 370/229 |
| 2006/0253735 A1 | * | 11/2006 | Kwak et al. | .................... 714/12 |
| 2007/0002826 A1 | * | 1/2007 | Bennett et al. | .............. 370/351 |
| 2007/0036096 A1 | * | 2/2007 | Sinivaara | ..................... 370/318 |

FOREIGN PATENT DOCUMENTS

| | | |
|---|---|---|
| JP | 06-319160 | 11/1994 |
| JP | 11-252626 | 9/1999 |
| JP | 2000-232540 | 8/2000 |

OTHER PUBLICATIONS

Link Aggregation According to IEEE 802.3ad, Apr. 4, 2002, v1.00.

* cited by examiner

*Primary Examiner*—John Pezzlo
*Assistant Examiner*—Saad Hassan
(74) *Attorney, Agent, or Firm*—Antonelli, Terry, Stout & Kraus, LLP.

(57) ABSTRACT

A network connection apparatus including: a plurality of line connection parts connected to network lines to transmit and receive packets; a transmission destination decision part for deciding a transmission destination on the basis of header information of a packet received by a first one of the plurality of line connection parts; a packet transfer part for transferring packets to a second line connection destination corresponding to the transmission destination decided by the transmission destination decision part; and, a power supply part for supplying power to the line connection parts and a power control part for controlling supply of power to each of the line connection parts from the power supply part.

6 Claims, 12 Drawing Sheets

METHOD OF REDUCING POWER CONSUMPTION OF NETWORK CONNECTION APPARATUS AND APPARATUS FOR SAME

INCORPORATION BY REFERENCE

The present application claims priorities from Japanese applications JP2005-255820 filed on Sep. 5, 2005, JP2006-143512 filed on May 24, 2006, the contents of which are hereby incorporated by reference into this application.

BACKGROUND OF THE INVENTION

The present invention relates to a network connection apparatus connected to network lines to relay data (packets and the like) and more particularly to reduction of power consumption.

Recently, the Internet is coming into indispensable existence in social activities as the lifeline in the same manner as water service, gas and electricity. With the indispensability of the Internet, the network is requested to realize the high reliability and the high availability at a low cost. On the other hand, the number of lines and the line speed are required to be increased in order to cope with increased traffic, although these requirements increase the power consumption of apparatuses.

As a reduction method of power consumption, JP-A-2000-232540, for example, discloses technique in which the fact that there is no off-hook state in facsimile is utilized to shift an operation mode to an energy saving mode.

SUMMARY OF THE INVENTION

However, the facsimile as described in the related technique is allowed to store communication, although a network relay apparatus such as a router is largely different therefrom in the premise that communication must be continued without delay. If communication is delayed, the influence thereof is increased since the Internet is already indispensable as the lifeline.

In view of such background, when the configuration of a conventional network connection apparatus corresponding to a network connected thereto is once decided, the power consumption thereof is fixed irrespective of the use situation such as a packet transfer amount of the network connection apparatus and cannot be varied to thereby consume electric power.

However, the number and the performance of the network connection apparatuses are increased steadily with the indispensability of the Internet as the lifeline and the energy consumption thereof is also increased. Particularly, the power consumption in urban areas where data centers are concentrated and the heat generation amount resulting therefrom cannot be neglected.

Accordingly, it is an object of the present invention to provide a network connection apparatus which can reduce the power consumption while suppressing influence to communication by varying supply power in accordance with the line use situation (traffic and time).

Particularly, there is Link Aggregation (hereinafter abbreviated as LA) as the technique utilized often in relation to expansion of the band in the network connection apparatus and it is standardized in IEEE 802.3ad (refer to "Link Aggregation according to IEEE 802.3ad"). The LA has the function that a plurality of Ethernet (registered trademark) lines are used to connect between the network connection apparatus and adjacent apparatuses and combined to set a single logical line so that it is treated as a virtual link. As a general example of use, in the construction of a network, in order to ensure the necessary band, the LA is used in a plurality of relatively inexpensive low-speed lines to form the virtual link without using expensive high-speed lines, so that the band can be expanded. The plurality of lines can form the virtual link to thereby realize the redundancy between the network connection apparatus and the adjacent apparatuses. The present invention is applied to the LA to thereby vary supply power in accordance with the line use situation (traffic and time), so that the power consumption can be reduced while ensuring the necessary band inexpensively.

In order to solve the above problem, for example, there is provided the network connection apparatus connected to a plurality of network lines comprising a plurality of line connection parts connected to network lines to transmit and receive packets, a transmission destination decision part for deciding a transmission destination on the basis of header information of packet received by a first one of the plurality of line connection parts, a packet transfer part for transferring packets to a second line connection destination corresponding to the transmission destination decided by the transmission destination decision part, a power supply part for supplying power to the line connection parts and a power control part for controlling supply of power to each of the line connection parts from the power supply part.

Further, for example, there is provided the network connection apparatus connected to a plurality of network lines comprising a plurality of line connection parts connected to network lines to transmit and receive packets, a transmission destination decision part for deciding a transmission destination on the basis of header information of packet received by a first one of the plurality of line connection parts, a packet transfer part for transferring packets to a second line connection destination corresponding to the transmission destination decided by the transmission destination decision part, a power supply part for supplying power to the line connection parts, a power control part for controlling supply of power to each of the line connection parts from the power supply part, a traffic monitoring part for monitoring traffic of the network lines connected to the line connection parts for each of the line connection parts or for each of the network lines and a power control condition memory for storing power control condition for supply of power from the power supply part and wherein the power control part compares the traffic monitored by the traffic monitoring part in regard to the first line connection part with the power control condition and controls to start supply of power to a third line connection part registered in the power control condition, of the plurality of line connection parts or network lines when the traffic is heavier than the power control condition.

Other objects, features and advantages of the invention will become apparent from the following description of the embodiments of the invention taken in conjunction with the accompanying drawings.

DESCRIPTION OF THE EMBODIMENTS

Preferred embodiments of the present invention are now described with reference to FIGS. 1 to 19. However, the present invention is not limited to the embodiments.

Embodiment 1

(1-1) Block Diagram

Figure 1:
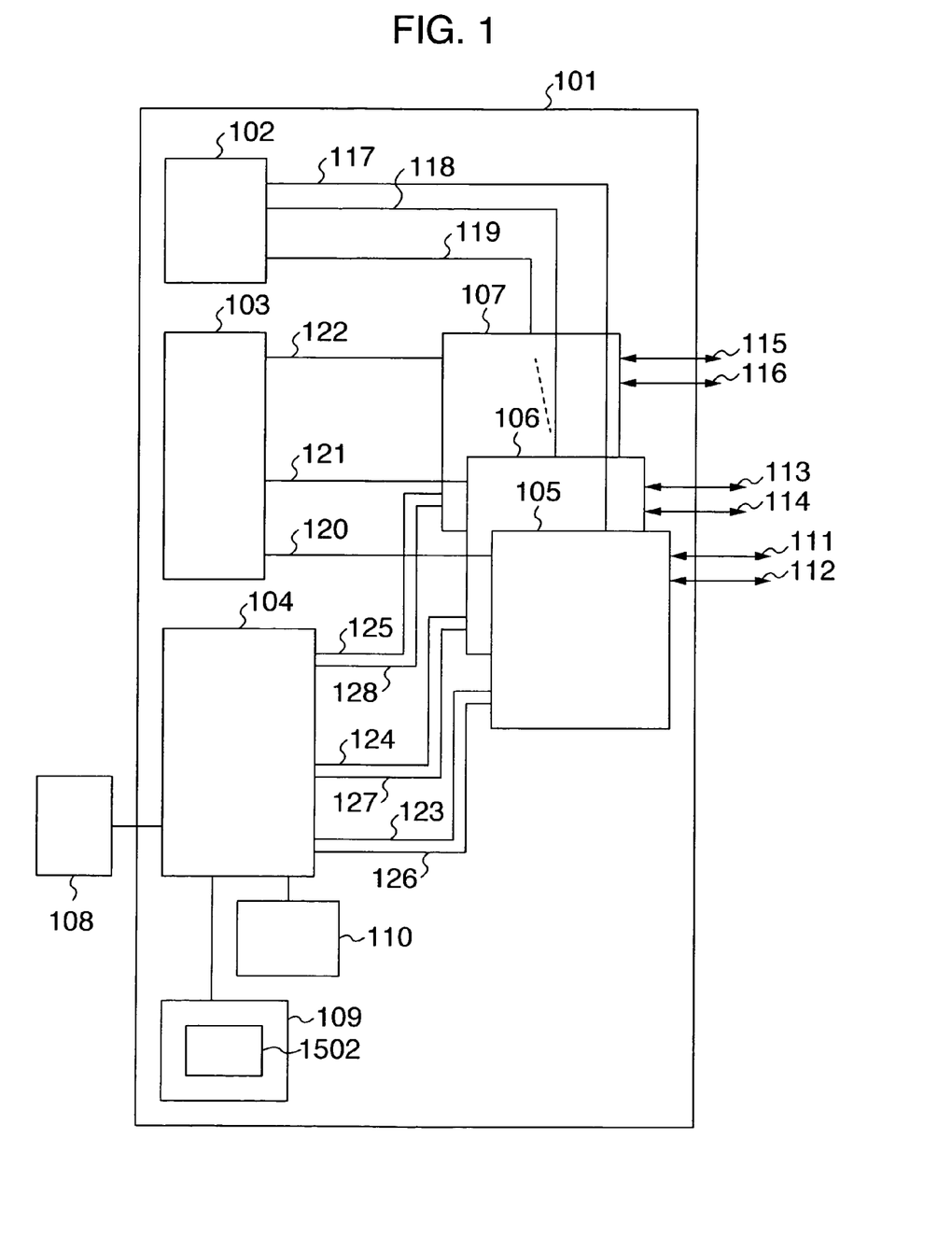
FIG. 1 is a block diagram schematically illustrating an example of a network connection apparatus 101.

FIG. 1 illustrates the whole configuration of an embodiment 1 of the present invention. Numeral 101 denotes a network connection apparatus, 102 a power source, 103 a crossbar switch, 104 a controller, 105 to 107 line cards, 108 a power control data input/output device, 109 a power control data memory, 110 a real time clock (RTC), 111 to 116 network lines, 117 to 119 power lines, 120 to 122 internal lines, 123 to 125 power control lines, and 126 to 128 line information signal lines. The power source 102 supplies electric power to the line cards 105 to 107 through the power lines 117 to 119. The line card 105 transmits/receives information to/from a network connected thereto through the network lines 111 to 112. The line cards 106 to 107 are the same as the line card 105. The crossbar switch 103 relays information between the line cards through the internal lines 120 to 122. The controller 104 transmits a power control signal to the line cards 105 to 107 through the power control lines 123 to 125, respectively. Further, the controller 104 transmits/receives information to/from the line cards 105 to 107 through the line information signal lines 126 to 128, respectively. The power control data input/output device 108 provides a picture for setting the power control condition for any line interface to be any condition and stores the inputted power control condition into the power control data memory 109. The RTC 110 supplies time information to the controller 104.

Figure 2:
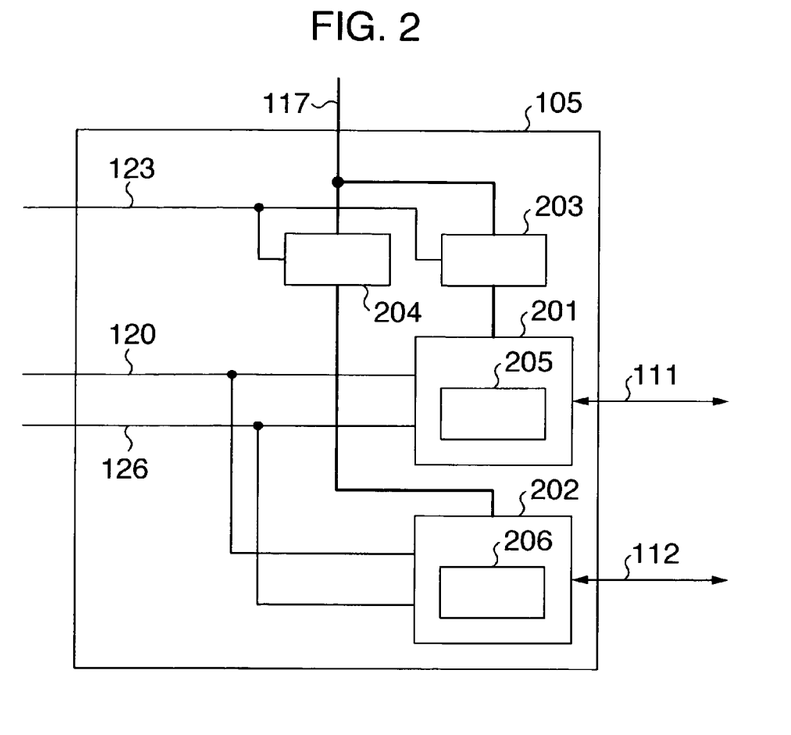
FIG. 2 is a block diagram illustrating a configuration example 1 of a line card 105 of the network connection apparatus 101.

FIG. 2 illustrates an internal configuration of the line card 105 in the network connection apparatus 101. Numerals 201 to 202 denotes line interfaces, 203 to 204 power controllers and 205 to 206 line monitoring devices. The line interface 201 transmits contents received from the network line 111 to the internal line 120. Further, the line interface 201 transmits contents relayed from the power source 102 to the network line 111. The line interface 202 transmits contents received from the network line 112 to the internal line 120. Further, the line interface 202 transmits contents relayed from the power source 102 to the network line 112. The line monitoring device 205 transmits traffic of the line interface 201 to the controller 104 through the line information signal line 126. The line monitoring device 206 transmits traffic of the line interface 202 to the controller 104 through the line information signal line 126.

The power controller 203 switches electric power supplied from the power source 102 through the power line 117 to supply the electric power to the line interface 201 on the basis of the power control signal transmitted from the controller 104 through the power control line 123. The power controller 204 switches electric power supplied from the power source 102 through the power line 117 to supply the electric power to the line interface 202 on the basis of the power control signal transmitted from the controller 104 through the power control line 123. The power supply to the line interfaces 201 to 202 can be switched independently to thereby switch connection/disconnection of the network lines 111 to 112 independently. As the power control method, the power supply to the line interfaces and the line cards is turned off and on, although a supply clock to the line interfaces and the line cards may be lowered to reduce the power consumption. It is considered that reduction of supply power contains power off and reduction of supply power. Further, it is considered that increase of supply power contains starting of power supply and recovery of reduced power.

Figure 15:
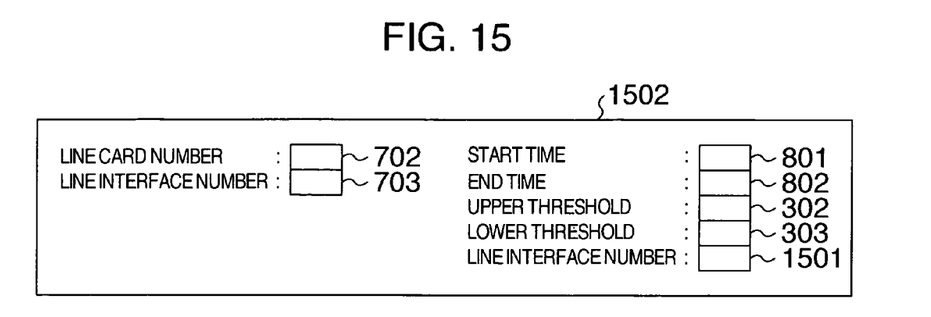
FIG. 15 shows an example of a power control condition table 1502.

FIG. 15 shows an example of a power control condition table 1502 stored in the power control data memory 109 (alternatively it may be the controller 104 or the power controller 204 or a higher rank apparatus such as a server). The power control condition table 1502 stores an upper threshold 302, a lower threshold 303, a start time 801 and an end time 802 described later with regard to a line card designated by line card number 702 and a line interface designated by line interface number 703. Further, a line interface number 1501 designating a line interface to which power supply is started when traffic of a relevant interface is increased is registered for the upper threshold 302. The line interface number 1501 preferably indicates an interface in which the relevant interface and the LA are set. Here, it is supposed that the LA is set to the network lines 111 and 112 that are physical lines of FIG. 2 so that the lines are regarded as a single logical line. As exemplified in FIG. 15, when the traffic of the line interface 201 exceeds the upper threshold, power supply to the line interface 202 is started. This attains very excellent effect in that while the line interface 202 is set to be operated in an energy saving mode, the line interface is recovered from the energy saving mode when traffic is increased and the load on the line interface 201 is reduced using the LA, so that delay of communication can be prevented.

(1-2) Control Method and Interface

Figure 3:
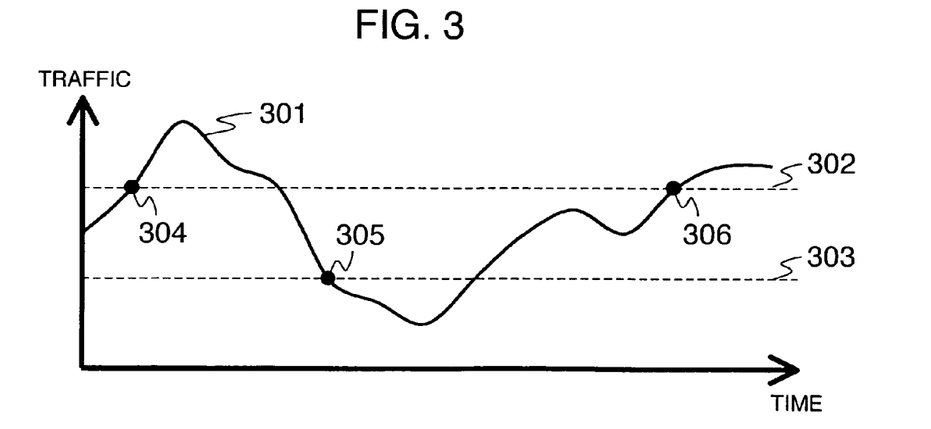
FIG. 3 is a line graph showing an example of the secular change of traffic and examples of thresholds set based on the traffic.

FIG. 3 is a graph having the abscissa axis indicating the elapse of time and the ordinate axis indicating traffic and showing an example of the traffic varied with the elapse of time. Numeral 301 denotes the traffic, 302 an upper threshold, 303 a lower threshold, 304 and 306 points at which the traffic exceeds the upper threshold 302, and 305 a point at which the traffic 301 is lighter than the lower threshold 303. The control method by line monitoring controls power supplied to the line interfaces in accordance with the traffic. Therefore, the power consumption in the network in which the traffic is difficult to predict is reduced effectively.

Referring now to FIGS. 4 to 7, the power control method by line monitoring is described in detail.

Figure 4:
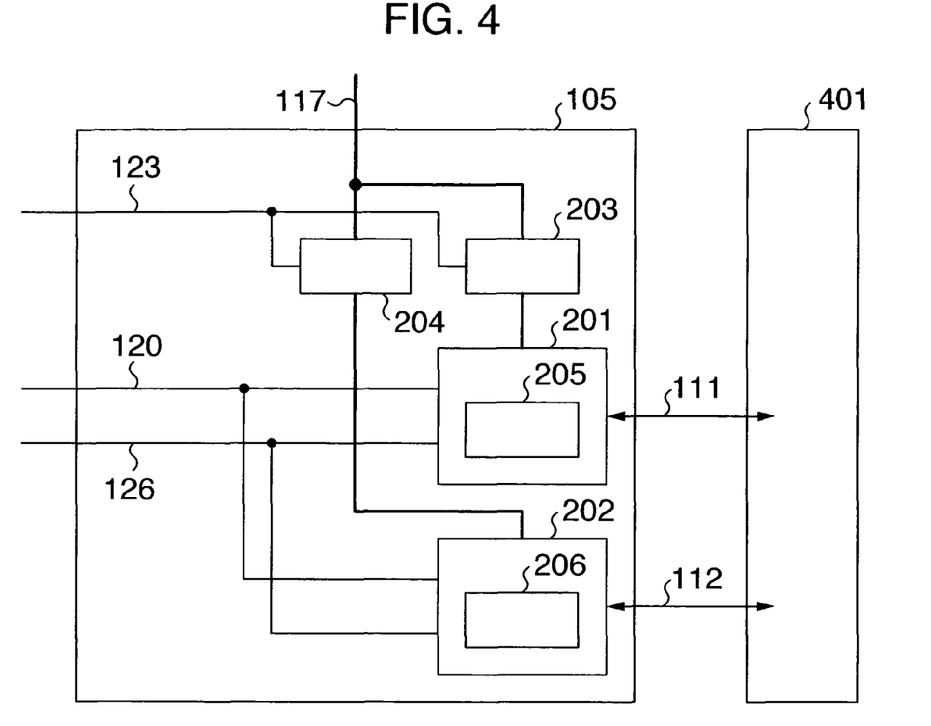
FIG. 4 is a block diagram illustrating an example of operation status of plural lines (LA) in the line card 105 shown in FIG. 2.

FIG. 4 illustrates an example of LA configuration using the network connection apparatus to which the present invention is applied. Numeral 401 denotes an opposite network connection apparatus connected to the line card 105 through the network lines 111 to 112. In FIG. 4, when the traffic is lighter than any lower threshold 303, the power controller 204 stops supply of power to the line interface 202 in response to a signal from the controller 104 and disconnects the network line 112.

Figure 5:
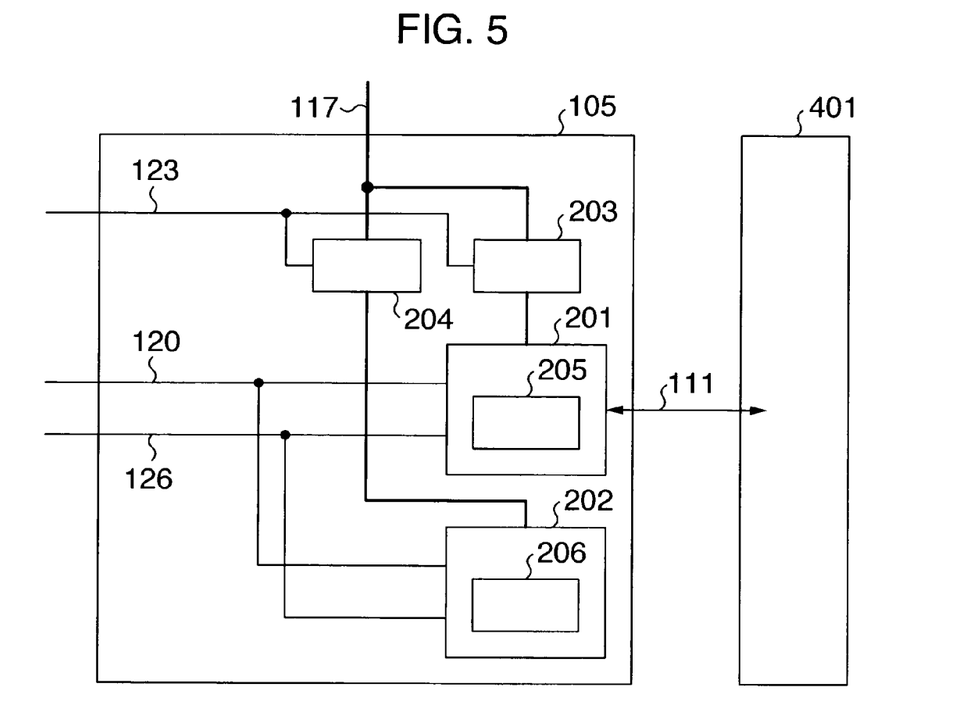
FIG. 5 is a block diagram illustrating an example of operation status of a single line in the line card 105 shown in FIG. 2.

FIG. 5 illustrates the disconnected state of the network line 112 from the state of FIG. 4. In FIG. 5, when the traffic 301 exceeds the upper threshold 302, the power controller 204 resumes supply of power to the line interface 202 in response to a signal from the controller 104 and restores the network line 112 to shift the circuit state to the state of FIG. 4.

Figure 6:
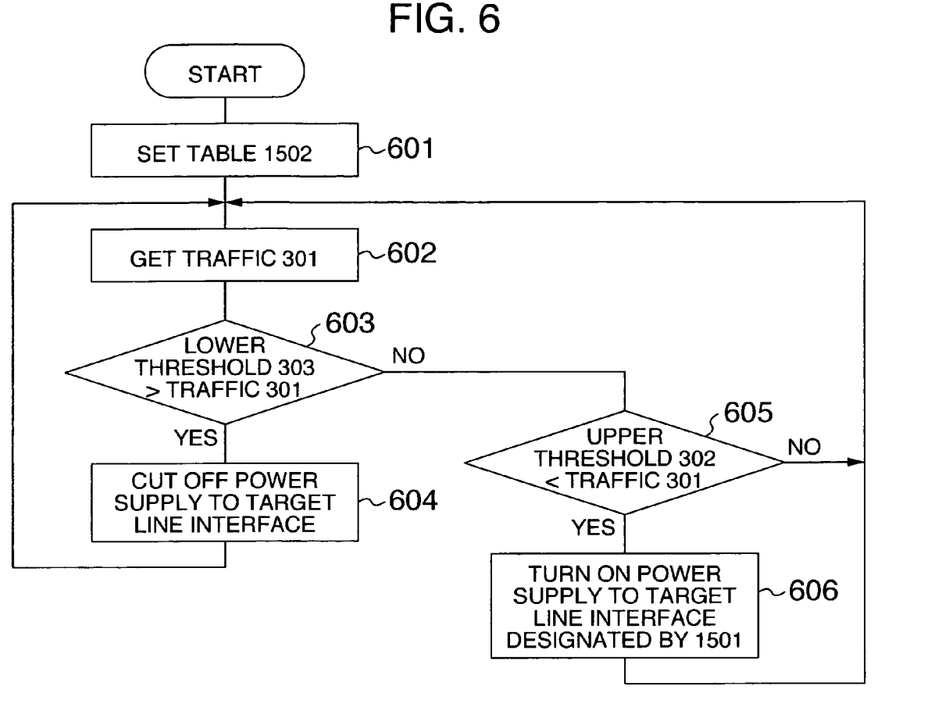
FIG. 6 is a flow chart showing a processing example of power control by traffic.

FIG. 6 is a flow chart showing a procedure of the power control using the upper threshold 302 and the lower threshold 303 with regard to variation of the traffic 301. The power control condition table 1502 (upper threshold 302, lower threshold 303 and line interface number 1501) for the line card or the line interface is set in the power control data memory 109 by means of the power control data input/output device 108 (step 601 and refer to FIG. 15). The line monitoring devices 205 and 206 are used to get the traffic 301 (step 602). Data get by the line monitoring device 206 is described. The traffic 301 get by the line monitoring device 206 is compared with the lower threshold 303 set for the network line 112 or the line interface 202 in step 601 (step 603). When the traffic 301 is lighter than the lower threshold 303 (lower than 305), the controller 104 sends a power off signal to the power controller 204 to cut off supply of power to the line interface 202 (step 604) and the processing is returned to step 602. When the supply of power is cut off in step 604, the line card is shifted to the state in which communication using the line interface 202 is not made as shown in FIG. 5.

In the state of FIG. 5, the line monitoring device 205 gets the traffic 301 (step 602). The gotten traffic 301 is compared with the lower threshold 303 set for the network line 111 or the line interface 201 in step 601 (step 603). When the traffic 301 is not lighter than the lower threshold 303 (No in step 603), the traffic 301 is compared with the upper threshold 302 (step 605). When the traffic 301 is heavier than or exceeds the upper threshold 302 (when the traffic 301 is heavier than the traffic at the points 304 and 306), the controller 104 sends a power supply signal to the power controller 204 to start supply of power to the line interface (line interface 202 in this example) designated by the line interface number 1501 (step 606) in accordance with the power control condition table 1502 set in the step 601 and the processing is returned to step 602. That is, the line card is shifted to the state as shown in FIG. 4. When the traffic 301 is not heavier than the upper threshold 302, the processing is returned to step 602.

In the above example, the traffic 301 used for the power control condition is obtained from each of the line monitoring devices 205 to 206 separately, although the traffic 301 may be that of the line card 105 that is the total traffic obtained from all the line monitoring devices 205 to 206. Alternatively, the traffic 301 may be the total traffic obtained from all the line interfaces or all the line cards set by the same LA in the whole network connection apparatus 101. Furthermore, the maximum traffic of the respective traffics obtained from all the line interfaces set by the same LA in the whole network connection apparatus 101 may be used for the power control condition.

Figure 7:
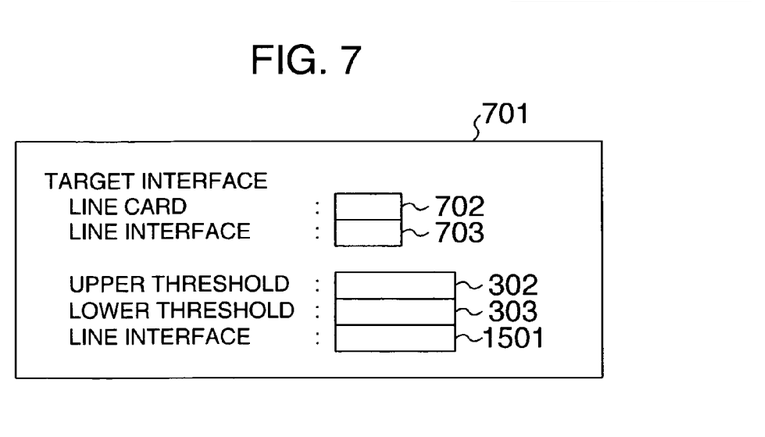
FIG. 7 shows an example of a condition setting interface for power control by traffic.

FIG. 7 shows an example of an upper threshold-lower threshold setting picture for the interfaces. Numeral 701 denotes a power control data input/output picture, 702 a target line card and 703 a target line interface. The power control data input/output picture 701 is displayed in the power control data input/output device 108. A target line card for which the power control condition is set is set in the column of 702. A target line interface for which the power control condition is set is set in the column of 703. Contents set in the power control data input/output picture 701 are stored in the power control data memory 109.

The threshold set in the power control data input/output picture is a ratio (%) to the whole band of the lines or a flow rate (bps) of information actually. Further, there is a column in which the number of the line interface to which supply of power is started when the traffic exceeds the threshold is entered (line interface number 1501). Data inputted in this picture is recorded in the power control condition table 1502 of FIG. 15.

The reason that the upper and lower thresholds are set is that system operation is avoided from being unstable when the traffic is moved up and down near the threshold in case where the upper and lower thresholds are not set. That is, the upper and lower thresholds may be the same, although it is preferable that the upper and lower thresholds are different.

As another utilization example of the power control by monitoring the traffic, there is an operation method in which a device for predicting the traffic is combined. Since this method can predict the traffic, stable operation can be expected without provision of the upper and lower thresholds. As described above, supply power to the line interfaces can be controlled in accordance with the traffic to thereby reduce the power consumption in the network in which the traffic is difficult to predict effectively.

Embodiment 2

An embodiment of the power control method by monitoring of time and a control condition setting interface is now described.

Figure 8:
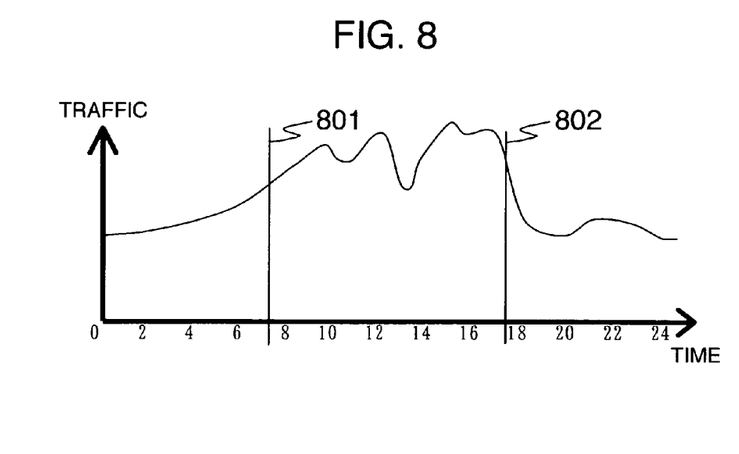
FIG. 8 is a line graph showing an example of the secular change of traffic and examples of thresholds set based on time.

FIG. 8 is a graph having the abscissa axis indicating time and the ordinate axis indicating traffic and showing an example of power control by start/end time. Numeral 801 denotes start time and 802 end time. The control method by time monitoring utilizes the start/end time to control power supplied to the line interfaces. In the network in which the traffic can be predicted, the power consumption can be reduced effectively.

Figure 9:
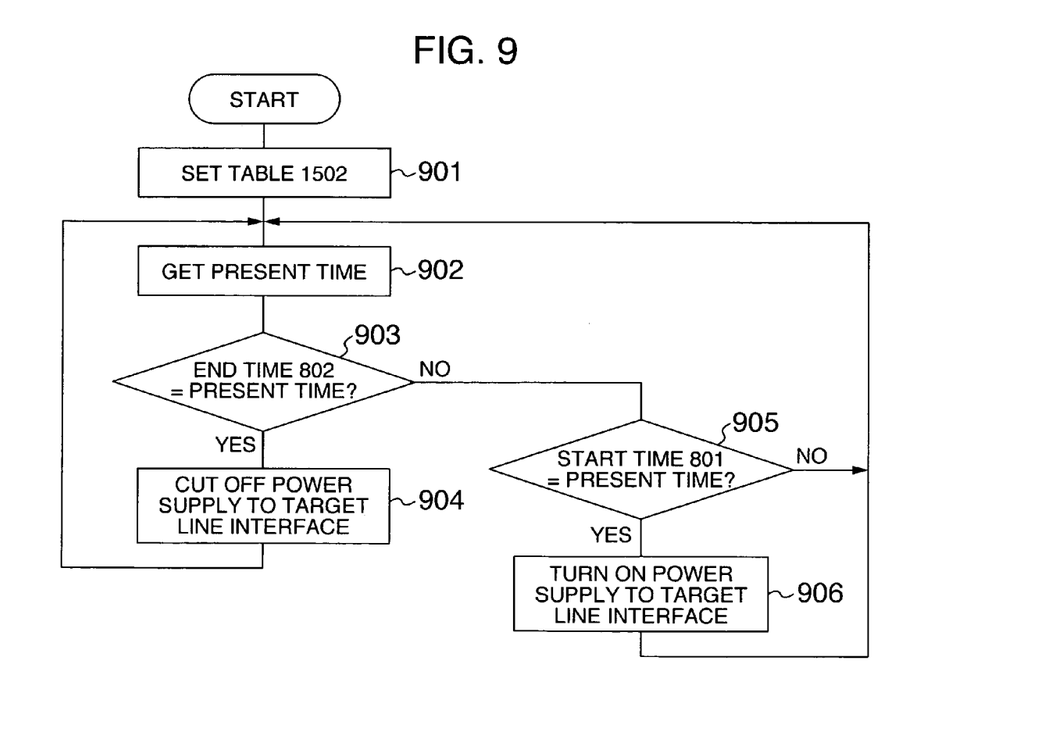
FIG. 9 is a flow chart showing a processing example of power control by monitoring of time.
Figure 10:
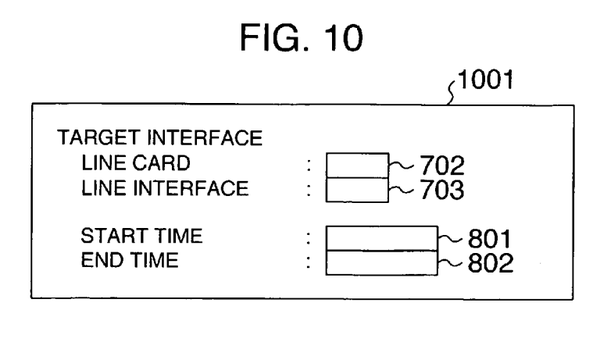
FIG. 10 shows an example of a condition setting interface for power control by monitoring of time.

Referring now to FIGS. 9 to 10, the power control method by time monitoring is described in detail. FIG. 9 is a flow chart showing a procedure of the power control using start time 801-end time 802. First, the power control data input/output device 108 sets start time 801-end time 802 for the line into the power control data memory 109 (step 901). Then, the RTC 110 is used to get the present time (step 902). The gotten present time is compared with the end time 802 set in step 901 (step 903). When it reaches the end time 802, the controller 104 sends the power off signal to the power controller 204 to cut off supply of power to the line interface 202 and the processing is returned to step 902. When it does not reach the end time 802, the gotten present time is compared with the start time 801 (step 905). When it reaches the start time 801, the controller 104 sends the power supply signal to the power controller 204 to start supply of power to the line interface 202 (step 906) and the processing is returned to step 902. When it does not reach the start time 801, the processing is returned to step 902.

FIG. 10 shows an example of a start time-end time setting picture for the line interfaces. Numeral 1001 denotes a picture outputted to the power control data input/output device 108. As another utilization example of the power control by time monitoring, there is an operation method in which the traffic and the line use time are previously decided by contract with line user. Since only the band required in accordance with the contract is required to be ensured in this method, the power control can be attained without influence of actual traffic. A planned control method using the time can be made more effectively.

As described above, supply power to the line interfaces can be controlled using the start/end time to thereby reduce the power consumption in the network in which the traffic can be predicted effectively.

Embodiment 3

Figure 11:
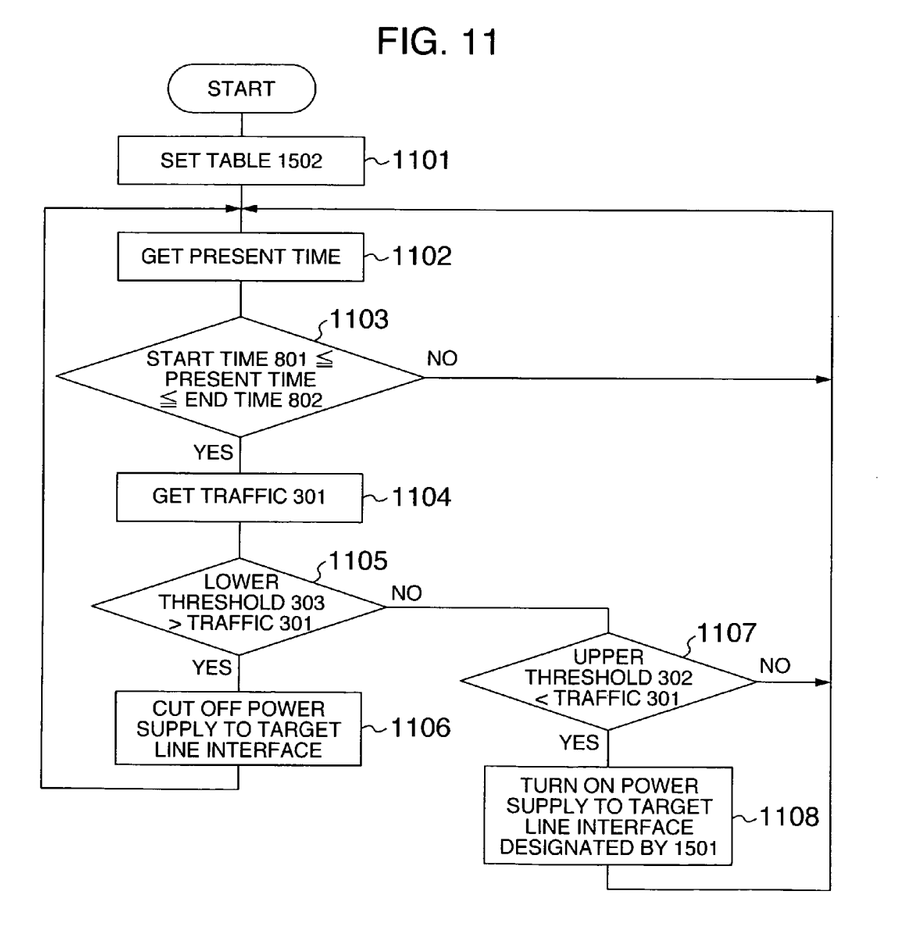
FIG. 11 is a flow chart showing a processing example of power control by monitoring of line and time.

The control utilizing the combination of the upper threshold 302—lower threshold 303 and the start time 801—end time 802 is described with reference to FIG. 11. First, the power control data input/output device 108 sets or stores the power control condition table 1502 (start time 801—end time 802 and upper threshold 302—lower threshold 303 and line interface number 1501) for the line cards or the line interfaces into the power control data memory 109 (step 1101). Then, the RTC 110 is used to get the present time (step 1102). The gotten present time is compared with the start time 801—end time 802 (step 1103). When it is between the start time 801 and the end time 802, the processing is returned to step 1102. When it is not between the start time 801 and the end time 802, the traffic 301 is gotten (step 1104). The gotten traffic 301 is compared with the lower threshold 303 (step 1105). When the traffic 301 is lighter than the lower threshold, the power supply to the line interface is cut off (step 1106) and the processing is returned to step 1102. When the traffic 301 is not lighter than the lower threshold, the traffic 301 is compared with the upper threshold 302 (step 1107). When the traffic 301 is heavier than or exceeds the upper threshold, power supply to the line interface designated by the line interface number 1501 of the power control condition table 1502 set in step 1101 is started (step 1108) and the processing is returned to step 1102. When the traffic 301 is not heavier than the upper threshold, the processing is returned to step 1102. In this example, the power control using the upper threshold 302 and lower threshold 303 is neglected with regard to variation of the traffic between the start time 801 and the end time 802.

Figure 12:
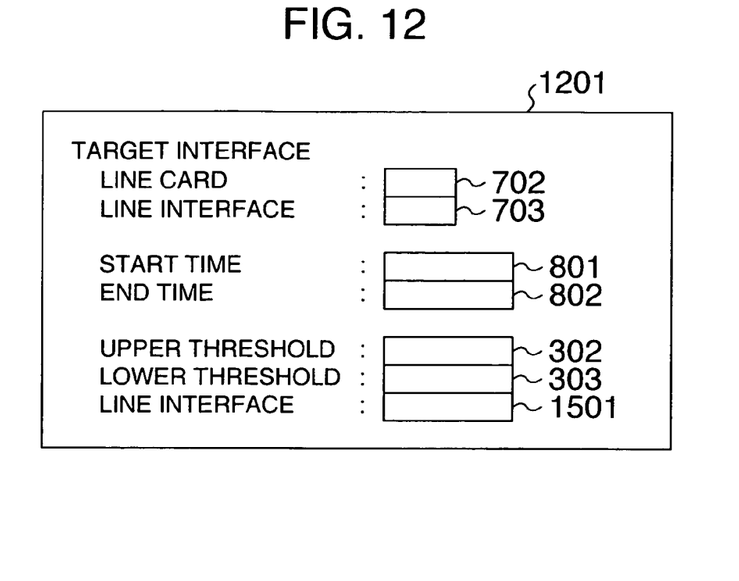
FIG. 12 shows an example of a condition setting interface for power control by monitoring of line and time.

FIG. 12 shows an example of a setting picture of the start time 801—end time 802 and the upper threshold 302—lower threshold 303 for any line interface in the control method. Numeral 1201 denotes a picture outputted to the power control data input/output device 108.

This example shows the combination of the power control method using line monitoring and the power control method using time and the combination of power control conditions containing priority of the power control method using line monitoring and the power control method using time can be set freely. For example, FIG. 12 shows an example in which the traffic is monitored when the present time is outside of a certain time range, while the traffic is monitored and when the traffic is heavier or lighter than the threshold it may be judged whether the present time is outside of the certain time range or not.

Embodiment 4

Figure 13:
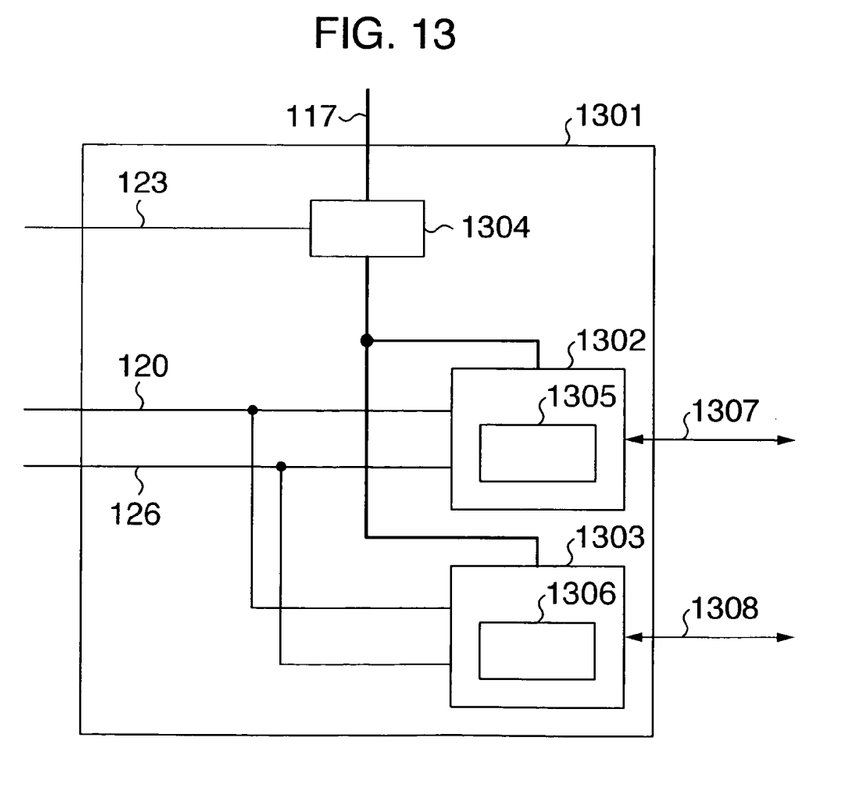
FIG. 13 is a block diagram illustrating a configuration example 2 of the line card 105 of the network connection apparatus 101.

FIG. 13 shows a variation of correspondence of the power controller and the line interfaces in the line card to which the present invention is applied. Numeral 1301 denotes a line card, 1302 to 1303 line interfaces, 1304 a power controller, 1305 to 1306 line monitoring devices and 1307 to 1308 network lines.

The line monitoring devices 1305 to 1306 report the traffic of the network lines 1307 to 1308 to the controller 104, respectively. The power controller 1304 controls power supplied to both the line interfaces 1302 and 1303 to be identical with each other in accordance with the signal from the controller 104.

The number of the power controllers for the line interfaces in the line card can be reduced to thereby lower the cost of the whole line cards.

Embodiment 5

Figure 14:
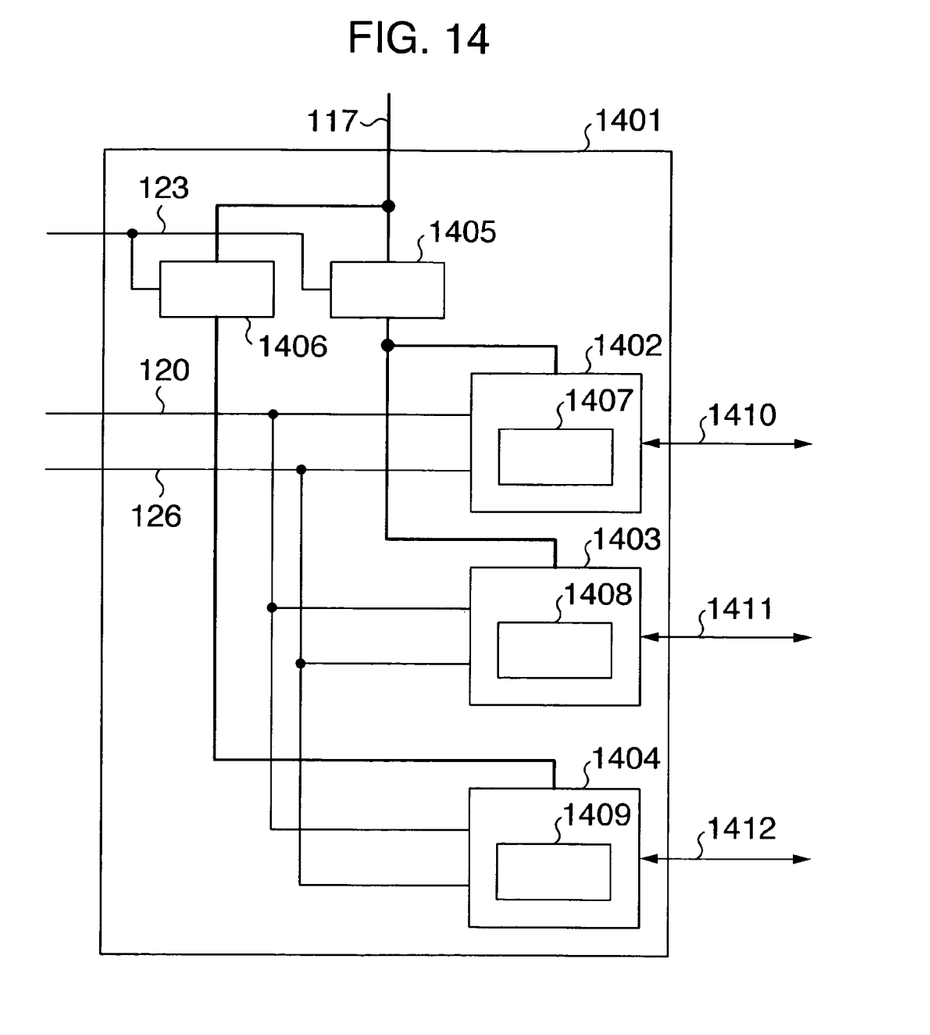
FIG. 14 is a block diagram illustrating a configuration example 3 of the line card 105 of the network connection apparatus 101.

FIG. 14 shows another variation of correspondence of the power controller and the line interfaces in the line card to which the present invention is applied. Numeral 1401 denotes a line card, 1402 to 1404 line interfaces, 1405 to 1406 power controllers, 1407 to 1409 line monitoring devices and 1410 to 1412 network lines. The line monitoring devices 1407 to 1408 report the traffic of the network lines 1410 to 1411 to the controller 104, respectively. The power controller 1405 controls power supplied to both the line interfaces 1402 to 1403 to be identical with each other in accordance with the signal from the controller 104. The line monitoring device 1409 reports the traffic of the network line 1412 to the controller 104. The power controller 1406 controls power supplied to the line interface 1404 in accordance with the signal from the controller 104.

In this configuration, the number of power controllers can be reduced as compared with the number of line interfaces in the line card, so that the line interface to be operated can be selected while the cost of the whole line card is reduced to thereby reduce the power consumption effectively.

Embodiment 6

Figure 19:
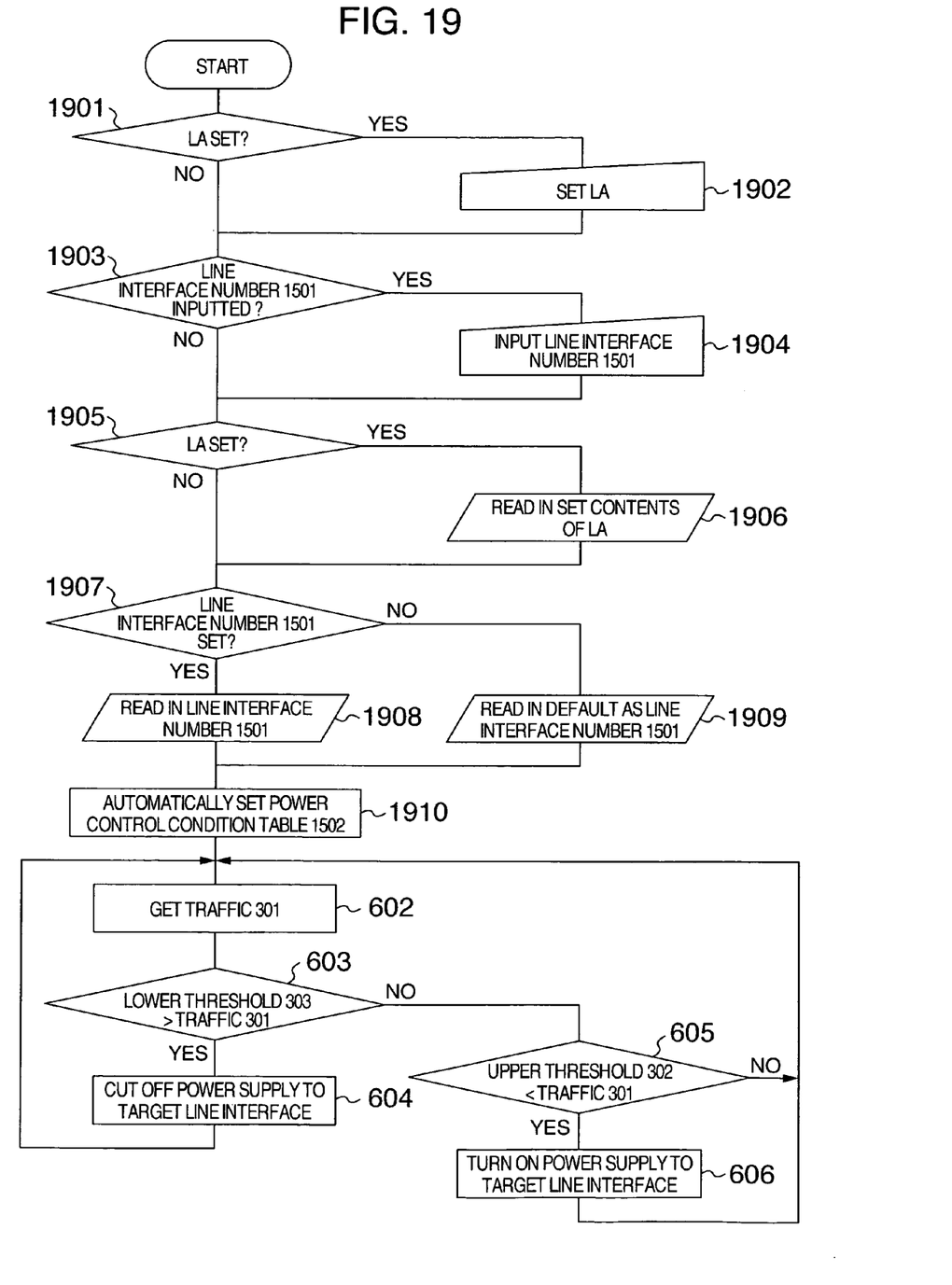
FIG. 19 is a flow chart showing a processing example of power control by traffic in which an automatic setting method of the power control condition table 1502 is combined.

FIG. 19 is a flow chart showing an example in which the flow of automatically setting the power control condition is added instead of the manually setting part (step 601) of the power control condition of FIG. 6 described in the embodiment 1.

First, the operator's command as to whether the LA configuration is set to any line interface in the network connection apparatus 101 or not is waited (step 1901). When the command for setting the LA configuration is received, the LA configuration is set in accordance with operator's input (step 1902). When there is no setting command of LA configuration, the processing proceeds to next step without doing anything. Next, the operator's command as to whether the line interface number 1501 is set for the line interface or not is waited (step 1903). When the setting command is received, the line interface number 1501 is set for the line interface in accordance with operator's input (step 1904). When there is no setting command, the processing proceeds to next step without doing anything.

Next, it is judged whether the LA configuration is set or not (step 1905) and when the LA configuration is set, the set contents of the LA configuration is read in (step 1906). When the LA configuration is not set, the processing proceeds to next step without doing anything. It is judged whether the line interface number 1501 is set or not (step 1907) and when it is set, the set contents is read in (step 1908). When it is not set, a previously set default value is set as the line interface number 1501 (step 1909).

Then, the power control condition table 1502 is automatically set on the basis of the data (data set in steps 1906, 1908 and 1909) set so far (step 1910). In step 602 and subsequent steps, the same processing as that of the embodiment 1 is performed on the basis of the power control condition table 1502 set automatically in step 1910.

Even in the embodiments 2 and 3, the manually inputted part of the power control condition can be replaced by the processing in steps 1901 to 1910 in the same manner as FIG. 19 to thereby automatically set the power control condition.

Embodiment 7

Figure 16:
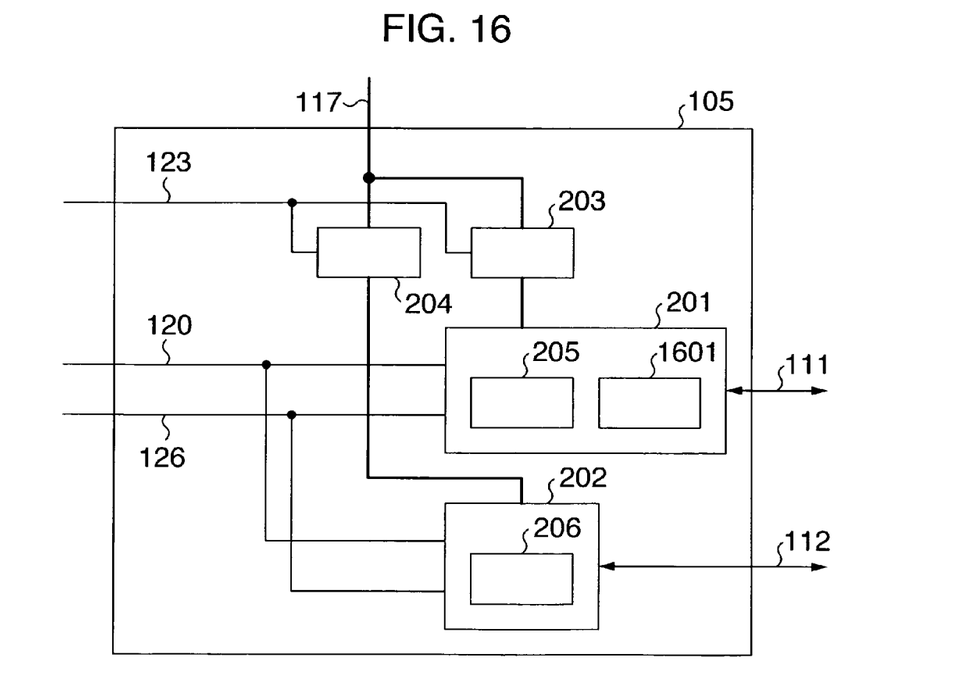
FIG. 16 is a block diagram illustrating the line card 105 including a shaper 1601.
Figure 17:
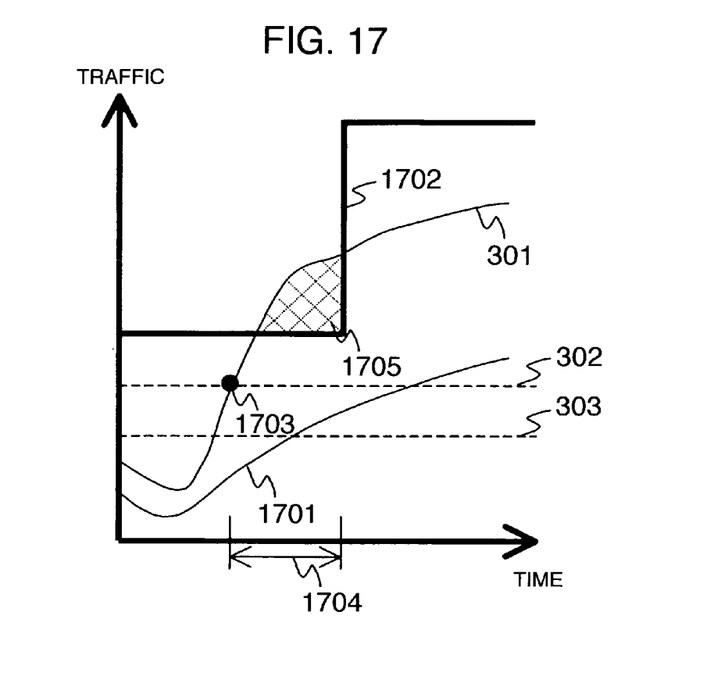
FIG. 17 is a line graph showing an example of the secular change of traffic having the priority and examples of thresholds set based on the traffic.

FIGS. 16 and 17 illustrate an embodiment in which a shaper device 1601 is added to the configuration shown in FIG. 2 and the network connection apparatus 101 makes power control in response to variation of the traffic when packets having the priority flow through lines. It is supposed that the LA configuration is set in the line interfaces 201 and 202. Further, the shaper device 1601 is a device that controls the band on the basis of priority of packets or kind of data.

In FIG. 17, numeral 1701 represents curve showing traffic occupied by packets having high priority of the traffic 301, 1702 represents line showing the band provided by the LA configuration set in the line interfaces 201 and 202, 1703 represents point where the traffic 301 exceeds the upper threshold 302, 1704 represents section showing a time lag from time the traffic 301 exceeds the upper threshold 302 to time that restoration of the line interface 202 is completed, and 1705 represents area showing the loss of packets in the traffic 301 produced during the time lag 1704.

When the traffic 301 exceeds the upper threshold 302 while the traffic 301 is varied as shown in FIG. 17, the controller 104 resumes supply of power to the line interface 202 (1703). At this time, when the traffic 301 continues to be increased rapidly, the traffic 301 sometimes exceeds the band 1702 before restoration of the line interface 202 to which power supply is resumed is completed (that is, before the line interface 202 is returned to the state that usual communication can be made) (1705). However, since the shaper device 1601 is added to the line interface 201, the shaper device 1601 can select packets having low priority of the traffic 301 and discard the packets to thereby reduce the loss from the traffic 1701 occupied by packets having high priority of the loss 1705 of packets possibly produced during the time lag 1704 from time that the traffic 301 exceeds the upper threshold 302 to time that restoration of the line interface 202 to which power supply is resumed is completed.

Figure 18:
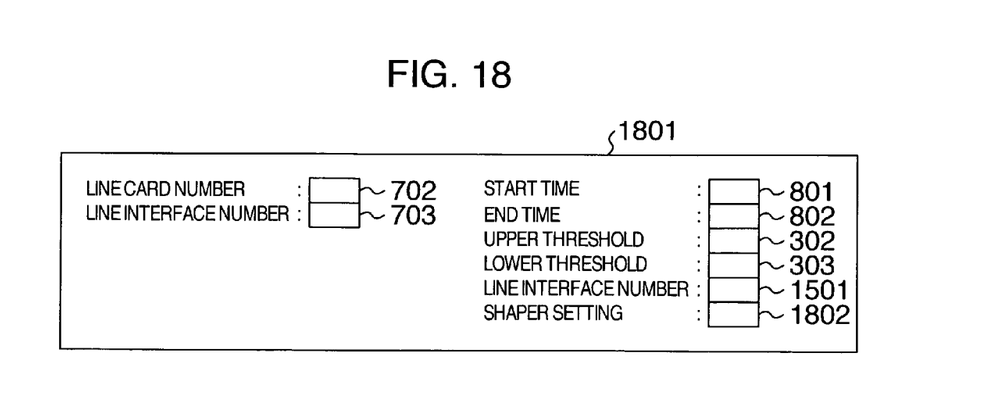
FIG. 18 shows an example of an interface of the power control condition table 1502 having setting 1802 of a shaper combined therein.

FIG. 18 shows an example of a power control condition table 1801 stored in the power control data memory 109 (that may be the controller 104, the power controller 204 or a higher rank apparatus such as a server alternatively). Numeral 1801 denotes an example of the power control condition table 1502, and 1802 denotes setting to the shaper device 1601. The shaper setting 1802 is added to the power control condition table 1502 to form the power control condition table 1801.

According to the embodiment, since power control can be made in accordance with the traffic for each line interface, the power consumption of the whole network connection apparatus can be reduced effectively. Particularly, the present invention is applied to LA to make it possible to reduce the power consumption without impairing low cost and high reliability that are merits of LA.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A network apparatus connecting to a neighboring apparatus via a logical line configuring a link aggregation including a plurality of physical lines, the network apparatus comprises:

a plurality of line interfaces respectively connected to said plurality of physical lines and being adapted to transmit and receive packets to and from the neighboring apparatus;

a plurality of traffic measuring parts being adapted to measure traffic of the respective physical lines;

a determination part being adapted to determine if total traffic measured by said plurality of traffic measuring parts meets any of predetermined conditions for each logical line;

a power control part being adapted to control supply of power to the line interfaces individually; and if the determination part determines that total traffic of a logical line meets a first condition, said power control part selects at least one line interface to which no power has been applied from among the line interfaces connected to the physical lines constituting said logical line and supplies power to the selected at least one line interface, and the selected at least one line interface starts transmitting and receiving packets via the physical line connected to the selected at least one line interface, if there are two or more than two line interfaces to which power has been supplied and the determination part determines that the total traffic of a logical line meets a second condition, said power control part selects at least one line interface to which power has been supplied from among the line interfaces connected to the physical lines constituting said logical line and stops supplying power to the selected at least one line interface, and the selected at least one line interface stops transmitting and receiving packets via the physical line connected to the selected at least one line interface.

2. A network apparatus according to claim 1, wherein when said power control part selects at least one line interface to which power has been supplied from among the line interfaces connected to the physical lines constituting said logical line, and stops supplying power to the selected at least one line interface, where said network apparatus is configured where power is supplied to at least one line interface among the line interfaces constituting said logical line all the time.

3. A network apparatus according to claim 2, wherein the first condition is that total traffic exceeds a predetermined upper limit value, the second condition is that total traffic falls below a predetermined lower limit value.

4. A network apparatus according to claim 1, wherein if a power supply condition which specifies that to which line interface power should be supplied within a predetermined time period is set in the determination part, said power control part supplies power to the line interfaces individually in accordance with the power supply condition regardless of the first and second conditions.

5. A network apparatus according to claim 4, where if a present time is not within the predetermined time period, said determination part determines if the total traffic of each logical line meets any of the predetermined conditions, and said power control part controls supply of power to the line interfaces individually according to the first and second conditions.

6. A network apparatus according to claim 1, further comprising a shaper which discards packets according to priority of traffic if the total traffic exceeds a bandwidth of the physical lines constituting said logical line.

* * * * *